United States Patent Office 3,527,722
Patented Sept. 8, 1970

3,527,722
FIRE RETARDANT ADDITIVE
Richard D. Carlson, Grand Island, and James J. Hodan, Williamsville, N.Y., assignors to Hooker Chemical Corporation, Niagara Falls, N.Y., a corporation of New York
No Drawing. Filed Oct. 30, 1967, Ser. No. 679,212
Int. Cl. C08f 7/02; C08g 17/16; C09d 5/14
U.S. Cl. 260—22                                    25 Claims

ABSTRACT OF THE DISCLOSURE

A new fire retardent additive for polymers is produced by a process which comprises (A) forming a mixture of an adduct of a polyhalogenated cyclopentadiene and a high molecular weight or polymeric material containing aliphatic carbon-to-carbon unsaturation, wherein substantially all double bonds of said material are adducted, and an adduct of a polyhalogenated cyclopentadiene and a polycarboxylic compound containing aliphatic carbon-to-carbon unsaturation; and (B) reacting the resulting product with a polyhydric alcohol. The additive is admixed with polymer compositions or with bituminous materials to impart flame retardency.

Applications of the polymer compositions of this invention include wire and cable insulation and jacketing, fabric coatings, sealants, and belting and roofing materials.

BACKGROUND

Resins which are flame retardant and have high resistance to heat are of considerable commercial importance. For example, they find employment in protective coatings such as paints, varnishes, applications for insulated wire and cable fabric coating, roofing materials, and the like, as well as molding compounds. New hexahalocyclopentadiene flame retardants which have the advantage of not detracting from the physical properties of the compositions in which they are introduced are described in copending applications S.N. 488,728, filed Sept. 20, 1965, now Pat. No. 3,449,279, issued June 10, 1969; S.N. 598,161, filed Dec. 1, 1966, now abandoned; and S.N. 598,212, filed Dec. 1, 1966, now abandoned. If these hexahalocyclopentadiene compounds are flaked or chipped, there is a possibility of agglomeration upon prolonged storage because of their relatively low softening point.

In processes employing hexahalocyclopentadiene, the excess reagent must be removed. Because of the extended time at elevated temperatures required to carry out the Diels-Alder reaction with the hexahalocyclopentadiene and to remove the excess hexahalocyclopentadiene, the product may gel and thermoset. The excess hexahalocyclopentadiene, if not removed, can give rise to very objectionable odors and vapors which may attack and irritate the eyes and sensitive membranes of the respiratory tract of workers handling this material. The chlorocarbon also acts as a skin irritant giving rise to a type of dermatitis. Additionally, the chlorocarbon may cause extensive corrosion damage to metal processing equipment if allowed to remain during subsequent reaction of the product. The prior art has accomplished removal of the excess reagent by either recrystallization, azeotropic distillation or by non-azeotropic distillation.

It is the object of this invention to provide a hexahalocyclopentadiene adduct resin with a higher softening point so as to eliminate any tendency of the resin to agglomerate. Another object of this invention is to provide a process for making said resins which will decrease the time necessary for formation. A further object is to provide a process in which the operating temperatures are decreased from those presently employed. It is also an object to provide a process in which the harmful effects of excess hexahalocyclopentadiene are effectively eliminated without the necessity of recrystallization, azeotropic or non-azeotropic distillation. A still further object of this invention is to accomplish all of the above objectives while producing a resin which will impart fire resistance and will not detract from the physical properties of compositions to which it s added. Another object is to produce fire retardant polymer compositions. A further object is to produce fire retardant bituminous materials.

SUMMARY OF THE INVENTION

This invention relates to new polyhalogenated cyclopentadiene resins, processes for their formation and their use in polymers and bituminous materials. More particularly, this invention relates to new polyhalogenated cyclopentadiene resins formed by a process which comprises (A) forming a mixture of an adduct of a polyhalogenated cyclopentadiene and a high molecular weight or polymeric material containing aliphatic carbon-to-carbon unsaturation, wherein substantially all double bonds of said material are adducted, and an adduct of a polyhalogenated cyclopentadiene and a polycarboxylic compound containing aliphatic carbon-to-carbon unsaturation; and (B) reacting the resultant product with a polyhydric alcohol. The resins are admixed with polymer compositions or with bituminuous materials to impart flame retardancy therein. Applications of the polymer compositions of this invention nclude wire and cable insulation and jacketing, fabric coatings, sealants and belting and roofing materials.

DESCRIPTION OF THE PREFERRED EMBODIMENT

In the first treatment step of the preferred process of this invention, a Diels-Alder adduct is made by reacting an excess of a polyhalogenated cyclopentadiene compound with a high molecular weight or polymeric material containing aliphatic carbon-to-carbon unsaturation.

The high molecular or polymeric material can be made by esterifying a polycarboxylic acid with a polyhydric alcohol, at least one of which contains aliphatic carbon-to-carbon unsaturation. Included among such materials are such naturally occurring materials as the glyceride drying oils, e.g., unsaturated vegetable or animal oils such as linseed, soya, tung, sesame, sunflower, safflower, cotton seed, herring, menhaden, and sardine oils, etc.; or chemically modified naturally occurring materials such as allyl ethers of starch, cellulose, or acrylate esters thereof, etc.; synthetic drying oil; polymers obtained by polyesterification of unsaturated polycarboxylic compounds such as maleic, fumaric, itaconic, aconitic, fluoromaleic, dimerized fatty acids, anhydrides or acid halides with saturated polyhydric alcohols such as disclosed hereinafter; or from allyl glycerol ether, methallylglycerol ether, glycerol monoacrylate, butenediol, pentenediol, or other unsaturated polyhydric alcohols polyesterified with saturated polycarboxylic compounds, such as adipic, succinic, suberic or sebasic acids, anhydrides, acid halides and the like. The preferred material is linseed oil, which is a glycerol ester of fatty acids having an iodine value of about 180. The iodine value (iodine number) is a measure of unsaturation, and is defined as the number of grams of iodine required per 100 grams of unsaturated material to obtain a saturated material. Theoretically, the polyhalogenated cyclopentadienes can be added to each of the double bond positions, thus making it possible to add up to about 6 polyhalogenated cyclopentadiene molecules per molecule of linseed oil. In the process of this invention, more than 6 moles of polyhalogenated cyclopentadiene, e.g., about 8 moles, are added for each mole of linseed oil.

The preferred polyhalogenated cyclopentadiene compound has the formula:

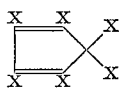

wherein each individual X is selected from the group consisting of fluorine, chlorine, bromine and alkoxy radical of 1 to 10 carbon atoms, said cyclopentadiene containing at least 4 and preferably 6 halogen substituents.

The polyhalogenated cyclopentadienes suitable for the use in this invention include: hexachlorocyclopentadiene; 5,5 - dimethoxytetrachlorocyclopentadiene; hexabromocyclopentadiene; 5,5-dibromotetrachlorocyclopentadiene; 5,5-difluorotetrachlorocyclopentadiene; 5,5-diethoxytetrachlorocyclopentadiene, and the like. Of these, hexachlorocyclopentadiene is preferred.

The Diels-Alder adduct may be prepared by mixing the polyhalogenated cyclopentadiene and the high molecular weight or polymeric material in a reaction vessel and heating to a temperature from about 150 degrees centigrade to about 250 degrees centigrade, preferably of about 170 to about 190 degrees centigrade, until the adduction of substantially all of the unsaturated material has occurred. When hexachlorocyclopentadiene and linseed oil are mixed, substantially all double bonds are adducted when, for example, a 6:1 ratio is heated at about 180 degrees centigrade for a period of 24 hours. This statement of time and temperature is not the minimum nor maximum time and temperature at which reaction may occur, i.e., at a higher temperature such as 200 degrees centigrade, the period of time required for the same de-degree of reaction would be considerably reduced as compared to the 24 hour period mentioned above. The process of this invention uses an excess of polyhalogenated cyclopentadiene and thereby is able to reduce the time and temperature normally required to carry the reaction to the required degree of completion. For example, 15 hours at 185 degrees centigrade is sufficient. In order to obtain a softening point of at least about 100 degrees centigrade, the reaction product of the second adduct, described in detail below, comprises about 20 to about 25% by weight of the final composition. In the preferred process, this is accomplished by employing at least about 20% excess hexachlorocyclopentadiene. The process then proceeds directly to the second reaction step without the need for removing any of the excess hexahalocyclopentadiene.

The second reaction step of the preferred process of the invention comprises reacting a polycarboxylic compound containing aliphatic carbon-to-carbon unsaturation with the product of the first step. Suitable compounds include unsaturated polycarboxylic acids or acid anhydrides or acid halides. Examples are the respective compounds of maleic; fumaric; substituted maleic and fumaric such as citraconnic, chloromaleic, mesaconic and pyrocinchonic; acetylene dicarboxylics; substituted succinics such as aconitic and itaconic; and the like. Of the numerous compounds which can be used, maleic anhydride is preferred. The compound undergoes a Diels-Alder reaction with the excess polyhalogenated cyclopentadiene to form a second adduct within the reaction mix. The adduct formed by hexachlorocyclopentadiene and maleic anhydride is chlorendic anhydride, which is 1,4,5,6,7,7 - hexachlorobicyclo - (2.2.1) - 5 - heptene-2,3-dicarboxylic anhydride.

The third reaction step of the preferred process comprises reacting a polyhydric alcohol with the mixture of adducts. The alcohol generally has 2 to 6 hydroxyl groups and 2 to about 10 carbon atoms. Typical polyhydric alcohols include: ethylene glycol; diethylene glycol; propylene glycol; dipropylene glycol; 1,4-butanediol; 1,4-butenediol; 1,4-butynediol; 1,3-butanediol; 1,2-butanediol; 1,2 - pentanediol; 1,3-pentanediol; 1,4-pentanediol; 1,5-pentanediol; 1,6-hexanediol; neopentyl glycol; 2,2,4-trimethyl-1,3-pentanediol; glycerol; hexanetriol; butanetriol; trimethylol propane; trimethylol methane; pentaerythritol; mannitol and the like. Of these, glycerol is preferred. The alcohol is added in an amount such that the number of hydroxyl groups is about equivalent to the number of carboxyl groups contributed by the polycarboxylic compound. However, higher and lower ratios can be employed, such as about 95 to 105 percent of hydroxyl groups based on the carboxyl and equivalent groups. By equivalent groups is meant other hydroxyl reaction groups such as acid anhydride, acid halide, and the like.

The resulting resin is a highly homogeneous solid and has a chlorine content of about 46 to about 52% by weight. It has a softening point of about 90° to about 200° C. and the reaction product of the polycarboxylic compound adduct and polyhydric alcohol comprises from about 15 to about 50% by weight of the resin. The expression "highly homogeneous" means that the components of said resin are more finely dispersed than can be obtained if a polyester is formed by reacting the polycarboxylic compound adduct with the polyol and then mixing the polyester with the high molecular weight or polymeric material adduct at room temperature.

An alternative manner of preparing this resin is to independently form the two Diels-Alder adducts described in the first and second reaction steps above. The excess polyhalogenated cyclopentadiene is removed by conventional means. The two adducts are admixed, and then reacted with a polyhydric alcohol.

The above alternative process can be further modified by adding a polycarboxylic compound containing carbon-to-carbon unsaturation to the reaction product of the high molecular weight or polymeric material and excess polyhalogenated cyclopentadiene to form some of the second adduct in situ, as in the preferred process. This eliminates the need to remove the unreacted cyclopentadiene. Then additional pre-formed second adduct is added to the reaction product, followed by reaction with the polyhydric alcohol.

The components used in these alternative methods are as used in the first method disclosed herein. Other changes and modifications within the scope of this invention will be apparent to those skilled in the art.

The resin of this invention is incorporated in a polymer in an amount sufficient to impart the desired amount of fire retardancy to the polymer. The specific minimum or maximum amount of the resin of this invention which may be incorporated into the polymer is dependent upon the particular physical properties of the polymer being employed, and dependent upon the desired use of the polymer to which the fire retardant has been added. However, the proportion will generally be in the range of 2 to 50 weight percent of the polymeric composition (including additive).

Typical polymers into which the resin of this invention can be incorporated include the homopolymers and copolymers of ethylenically unsaturated aliphatic, alicyclic and aromatic hydrocarbons such as polyethylene, polypropylene, polyacrylonitrile, polybutene, ethylenepropylene copolymers including ethylenepropylene terpolymers; copolymers of ethylene or propylene with other olefins; polybutadiene; polymers of butadiene, polyisoprene, both natural and synthetic, polystyrene and polymers of pentene, hexene, heptene, octene, 2-methylpropene, 4-methylhexene-1, bicyclo-(2.2.1)-2-heptene, pentadiene, hexadiene, 2,3-dimthylbutadiene-1,3,4-vinylcyclohexene, cyclopentadiene, methylstyrene and the like. Other polymers include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfural ketone); hydrocarbon resins from petroleum; isobutylene resins (polyisobutylene); isocyanate resins (polyurethanes); melamine resins such as melamine-formaldehyde and melamine-urea-formaldehyde; oleo-resins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and long chain synthetic polymeric amides containing recurring carbonamide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, polybutadiene, ethylene-propylene rubber, cross-linked polyethylene, cyclized rubber, butadiene-acrylonitrile rubber, butadiene-styrene rubber, acrylic rubber, acrylonitrile-butadiene-styrene rubbers, butyl rubber, chlorosulfonated polyethylene, chlorinated rubber, styrene-butadiene rubber, neoprene rubber (polychloroprene), polyisoprene rubbers, polysulfide rubbers, silicone rubbers, urethane rubbers; polysulfides (Thikol); terpene resins; urea resins; high styrene resin lattices, high styrene resins, vinyl resins such as polymers of vinyl acetal, vinyl acetate or vinyl alcohol-acetate copolymer, vinyl alcohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bisphenols, thermoplastic polymers of bisphenols and epichlorohydrin (trade named Phenoxy polymers); graft copolymers and polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the trade name of Kydex 100; and the like.

The resin of this invention is incorporated in bituminous materials in an amount sufficient to impart the desired amount of fire retardancy to the material. Generally, the resin is employed in an amount from about 2.5 to about 50% by weight and preferably from about 5 to about 40% by weight of the bituminous composition.

Many types of bituminous materials are commercially available ranging from those derived from petroleum (asphaltic products), to those derived from coal tar. The asphaltic products include native asphalts, residual asphalts, blown petroleum asphalts precipitated by propane, fatty-acid pitches, and asphalts modified with oils such as lineed oil, cotton seed oil, castor oil, vegetable oils and animal oils, and various mixtures thereof. The tar products include the pitch obtained by distilling the highly volatile oils from coal tar as well as combinations thereof with oil gas tar and water-gas tar. These materials are provided in the form of semi-liquids to semi-solids where they are to be used for impregnating felted or woven fabrics in roofing and insulating compositions. The same groups of substances are commonly prepared with a harder consistency and also with a higher fusing-point. The latter materials are primarily used for coating or adhesive compositions. The foregoing list of bituminous materials is set forth to provide a better understanding of the type of material contemplated by the term "bituminous material." These and other bituminous materials are useful in the present invention.

The temperature of mixing the components of the invention is not critical, ranging from the temperature at which the bituminous material becomes fluid, up to the decomposition temperature of said bituminous material.

The asphalt used may be stabilized with for example, calcium carbonate or asbestos fiber. It is also within the scope of the present invention to use other powdered or fibrous fillers, pigments, etc., that are commonly used in the art. Such substances may be either inorganic or organic in origin and are used for reducing the cost of the finished product, to impart weather resistance or to impart color to surface coatings. Commonly used additives include silica, limestone, slate dust, clay, asbestos fibers, and black and colored pigments. Various halogenated wax products may also be incorporated in the compositions of the invention.

Arsenic, antimony and bismuth compounds can be added to the resin-polymer composition or resin-bituminous material composition to improve flame retardance. These elements are normally added in the form of their respective oxides and/or sulfides, but other compounds can be used wherein the arsenic, antimony or bismuth is provided. Suitable compounds, particularly antimony compounds, include the sulfides of antimony, antimony salts of organic acids and their pentavalent derivatives and the esters of antimonous acids and their pentavalent derivatives. Sodium antimonite or potassium antimonite are conveniently used when it is desirable to use an alkali metal salt of the antimony as the added reagent. Other suitable antimony compounds include the organic salts of organic acids and their pentavalent derivatives including antimony butyrate, antimony valerate, antimony caproate, antimony heptylate, antimony caprylate, antimony perlargonate, antimony caprate, antimony cinnamate, antimony anisate and their tri- and pentavalent derivatives. Likewise, the esters of antimonous acids and their pentavalent derivatives such as tris(n-octyl) antimonite, tris(2-ethylhexyl) antimonite, tribenzyl antimonite, tris-(β-chloroethyl) antimonite, tris(β-chloropropyl) antimonite, tris(β-chlorobutyl) antimonite and their pentavalent dihalide derivatives. Still other suitable organic antimony compounds are the acyclic antimonites such as trimethylol cyclopropane antimonite, pentaerythritol antimonite and glycerol antimonite. Equally satisfactory results are obtained with the oxides and sulfides of bismuth and arsenic as well as lead salts of arsenic acids.

The following examples are intended solely to illustrate the particular aspects of the invention disclosed herein, and are not intended to limit this invention. All percentages and parts in this disclosure, and the following examples, are by weight, and all temperatures are in degrees centigrade, unless otherwise stated or understood.

EXAMPLE 1

A Diels-Alder adduct was prepared by reacting hexachlorocyclopentadiene and linseed oil so that substantially all double bonds were adducted and the excess hexachlorocyclopentadiene removed by conventional means. The resulting adduct had a softening point of 87 degrees centigrade. A second adduct was prepared by reacting hexachlorocyclopentadiene with maleic anhydride. A mixture was then made of 121 grams of this adduct, 400 grams of the linseed oil adduct, and 22 grams of glycerol. The mixture was heated at about 180–190 degrees centigrade for five hours and then stripped at about 185 degrees centigrade and 20 millimeters of mercury pressure for two hours. The product was a highly homogeneous solid which had a softening point of 109 degrees.

EXAMPLE 2

420 grams of linseed oil and 900 grams of hexachlorocyclopentadiene were placed in a reaction vessel which was heated at 180 degrees centigrade for about 20 hours. The material contained about 9% excess hexachlorocyclopentadiene by analysis which was decreased to 3.3% by stripping for three hours at 180 degrees centigrade and 20 millimeters of mercury. A charge of 17 grams of maleic anhydride was added to the vessel, maintained for five hours at 180–185 degrees centigrade and then stripped at 180–185 degrees centigrade and 20 millimeters pressure with a nitrogen sparge for two hours. Analysis showed that the softening point of the product was 85 degrees centigrade and only a trace of hexachlorocyclopentadiene remained.

A mixture of 400 grams of this product, 121 grams of a hexachlorocyclopentadiene maleic anhydride adduct prepared as in Example 1, and 22 grams of glycerol was heated at 185–190 degrees centigrade for six hours and stripped as previously described for two hours. The resulting resin was highly homogeneous and had a softening point of 115 degrees centigrade.

EXAMPLE 3

A charge of 420 grams of linseed oil was placed in a a reaction vessel and held at 180–185 degrees centigrade while 1120 grams of hexachlorocyclopentadiene were added over a period of one hour. The vessel was maintained at this temperature for 15 hours. At this point, analysis showed that the mix contained 20% excess hexachlorocyclopentadiene. A charge of 111 grams of maleic anhydride was added to the vessel, which was maintained at 180–185 degrees centigrade for four hours. Then 69.5 grams of glycerol were added to the vessel and the water of esterification was allowed to distill out for four hours at 180–185 degrees centigrade. The mix was stripped at a pressure of 20 millimeters and a temperature of 185 degrees centigrade for two hours with a nitrogen sparge. The softening point of the highly homogeneous product was found to be 121 degrees centigrade and it contained 0.2% unreacted hexachlorocyclopentadiene.

EXAMPLE 4

A charge of 525 grams of safflower oil and 500 grams of hexachlorocyclopentadiene was placed in a reaction vessel and held at 180–185 degrees centigrade while an additional charge of 524 grams of hexachlorocyclopentadiene was added over a period of one hour. The vessel was maintained at this temperature for 14 hours. Then 81.2 grams of maleic anhydride were added over a period of thirty minutes and the temperature was maintained at 180–185 degrees centigrade for 4 hours. Thereafter, 53.4 grams of glycerol were added over a period of thirty minutes and the vessel was held at 180–185 degrees centigrade for 4 hours. The softening point of the highly homogeneous product was found to be about 157 degrees centigrade.

EXAMPLE 5

A charge of 420 grams of Light Cold-Pressed marine oil, a fish oil, was placed in a reaction vessel and held at 180–185 degrees centigrade while 1024 grams of hexachlorocyclopentadiene were added over a period of one hour. The vessel was maintained at this temperature for 15 hours. At this point, analysis showed that the reaction mixture contained 19% excess hexachlorocyclopentadiene. A charge of 81.2 grams of maleic anhydride was added over the period of thirty minutes and the temperature maintained at 180–185 degrees centigrade for 4 hours. Then 54 grams of glycerol were added and the water of esterification allowed to distill out for 4 hours at 180–185 degrees centrigrade. The mixture was stripped with a nitrogen sparge at about 185 degrees centigrade and a pressure over 15 millimeters for 4 hours. The highly homogeneous product contained 49% chlorine, 0.3% unreacted hexachlorocyclopentadiene and had a softening point of 103 degrees centigrade.

EXAMPLE 6

A resin was prepared as in Example 3 and compounded with styrene in the ratio of 30/70. This was tested by the ASTM D 635 method modified by hand molding in a glass tube. The unmodified styrene control specimens had an average burning rate of 1.66 inches per minute, dripped and had no afterglow. The resin-modified test specimens had an average burning rate of 1.33 inches per minute, did not drip and had no afterglow.

EXAMPLES 7–12

A resin was prepared as in Example 3 and was compounded with butadiene-styrene rubber (SBR), ethylene-propylene copolymer (EPR), ethylene-propylene terpolymer (EPT), butyl rubber, natural rubber and cross-linked polyethylene (XLP). The method employed consisted of banding the elastomer on a two-roll, seven-inch rubber mill for about one to two minutes, followed by the gradual addition of carbon black mixed with the desired extending oil, resin and antimony oxide. Milling was continued to insure complete dispersion of the ingredients, at which time accelerators and curing agents were added, blended thoroughly for two minutes and press cured. The results of tests for hardness (Shore $A_2$), fire retardancy (ASTM D–635–56T), and weight loss upon heat aging (seven days at 120 degrees centigrade) are reported in Table I.

TABLE I

| Composition | 7 EPR | 8 EPT | | 9 SBR | | 10 Butyl | | 11 Natural | | 12 XLP | |
|---|---|---|---|---|---|---|---|---|---|---|---|
| Polymer, parts | 100 | 100 | 100 | 100 | 100 | 100 | 100 | 100 | 100 | 100 | 100 | 100 |
| Carbon black, parts | 110 | 110 | 150 | 150 | 40 | 40 | 50 | 50 | 50 | 50 | 20 | 20 |
| Oil, parts | 10 | | 40 | 20 | 10 | | 20 | | 5 | | | |
| Accelerators and curing agents, parts | 8.02 | 8.02 | 9.5 | 9.5 | 8.2 | 11.4 | 10.8 | 10.8 | 11.7 | 11.7 | 4.75 | 4.75 |
| Resin, parts | | 30 | | 30 | | 30 | | 30 | | 30 | | 30 |
| Antimony trioxide, parts | | 6 | | 15 | | 10 | | 15 | | 15 | | 15 |
| Milling time, min. at ° C | 40 at | 110 | 30 at | 110 | 20 at | 60 | 30 at | 60 | 30 at | 75 | 24 at | 120 |
| Cure time, min. at ° C | 30 at | 160 | 40 at | 160 | 40 at | 140 | 30 at | 160 | 10 at | 160 | 20 at | 160 |
| Hardness | 80 | 92 | 85 | 93 | 64 | 68 | 62 | 83 | 65 | 65 | 96 | 96 |
| Self-extinguishing time, sec | Burning | 3.5 | Burning | >45 | Burning | 1.8 | Burning | 3.7 | Burning | 1.5 | Burning | 27.3 |
| Inches burned | | 0.0 | | 0.0 | | 0.1 | | 0.1 | | 0.1 | | 0.0 |
| Heat aging, weight loss, percent | 4.4 | 1.6 | 6.6 | 4.3 | 7.5 | 3.6 | 8.5 | 2.3 | 2.5 | 1.7 | >1.0 | 1.0 |

EXAMPLES 13–15

A resin was prepared as in Example 3 and was compounded with polypropylene (PP), polyethylene (PE) and a graft copolymer of polybutadiene, styrene and acrylonitrile (ABS) as described in Examples 7–12, with the exception of being injection molded. The results of tests for hardness (Shore D) and flammability (ASTM D–635–56T) are reported in Table II.

TABLE II

| Polymer | 13 PP | 14 PE | | 15 ABS | |
|---|---|---|---|---|---|
| Polymer, parts | 100 | 60 | 100 | 60 | 100 | 71.5 |
| Resin, parts | 26.7 | 20 | | 20 | | 21.3 |
| Antimony oxide, parts | 13.3 | 10 | | 10 | | 7.2 |
| Carbon black, parts | | | | 10 | | |
| Injection molding temperature, ° F | 400 | | 275 | | 425 | |
| Hardness | 76 | 80 | 51 | 58 | 76 | 76 |
| Self-extinguishing time, sec. burning | Burning | 2.0 | Burning | 7.0 | Burning | 7.0 |
| Drip | | None | | None | | None |

EXAMPLE 16

A resin prepared as in Example 3 was compounded with a polyester of phthalic anhydride, maleic anhydride, propylene glycol and styrene, and subjected to the ASTM 757 test. The composition of the test samples and the results of the ASTM test are reported in Table III.

TABLE III

| | | |
|---|---|---|
| Polyester, parts | 50 | 50 |
| Styrene, parts | 5 | 5 |
| Benzoyl peroxide and tricresyl phosphate, parts | 1 | 1.35 |
| Resin, parts | | 15 |
| Antimony trioxide, parts | | 5 |
| Self-extinguishing time, sec. (average) | Burning | 1.9 |

EXAMPLE 17

A resin prepared as in Example 3 was compounded with an epoxy of bisphenol A and epichlorohydrin, and tested by ASTM 757. The composition of the test samples and ASTM results are shown in Table IV.

TABLE IV

| | | |
|---|---|---|
| Epoxy, parts | 50 | 50 |
| Glycerol, parts | 0.2 | 0.2 |
| Tetraethylenepentamine, parts | 7.5 | 10.5 |
| Resin, parts | | 15 |
| Antimony trioxide, parts | | 5 |
| Self-extinguishing time, sec. (average) | Burning | 60.7 |

EXAMPLE 18

A uniform mixture was made of 100 parts of an asphalt-asbestos fiber-mineral spirits composition, 6.1 parts resin and 3 parts arsenic trioxide. A coating was applied to three inch by twelve inch pieces of glass mat previously saturated with asphalt known as composition shingle, by applying the prepared asphalt composition with a knife at a coverage rate of two gallons for each 100 square feet. This coverage provided a dried film of about 1/16 of an inch. The glass mat with an applied asphalt coating was then laminated by placing one piece over the other to form two ply lay-ups. The lay-ups were allowed to dry for three days at room temperature, then at 50 degrees centigrade for 24 hours thereby removing substantially all of the solvent.

Testing was performed to determine the relative flammability of the coating by supporting the various prepared lay-up strips at an angle of 60 degrees from the vertical, in a draft free hood, and applying a flame from a compressed propane portable blow torch. The torch flame was adjusted to give a 1½ inch inner blue cone and was applied perpendicular to the face of the strip for a period of 15 seconds and then removed. The time for self-extinguishing was recorded. A second 15 second flame application was made immediately after the first flame was extinguished and the time for self-extinguishing after the second application of the flame was recorded. If the specimen was self-extinguishing or did not burn upon the second ignition it was judged to be self-extinguishing by this test.

The prepared composition of this example had an average self-extinguishing time 3.8 seconds after the first ignition and 70.2 seconds after the second ignition.

Various changes and modifications can be made in the process of this invention without departing from the spirit and scope of the invention. The various embodiments of the invention disclosed herein serve to further illustrate the invention but are not intended to limit it.

We claim:

1. A process which comprises (A) forming a mixture of an adduct of a polyhalogenated cyclopentadiene of the formula:

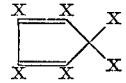

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyesters of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted, and an adduct of a polyhalogenated cyclopentadiene of said formula and a polycarboxylic compound containing carbon-to-carbon unsaturation, and (B) reacting the resulting product with a polyhydric alcohol.

2. The process of claim 1 wherein the high molecular weight or polymeric material adduct is formed by reacting excess polyhalogenated cyclopentadiene with said high molecular weight or polymeric material.

3. The process of claim 2 wherein the polycarboxylic compound adduct is formed by reacting said polycarboxylic compound with the excess unreacted polyhalogenated cyclopentadiene.

4. The process of claim 3 wherein an additional amount of said polycarboxylic compound adduct is added before reacting the resultant product with a polyhydric alcohol.

5. The process of claim 1 wherein the high molecular weight or polymeric material adduct is the adduct of hexachlorocyclopentadiene and linseed oil, the polycarboxylic compound adduct is chlorendic anhydride, and the polyhydric alcohol is glycerol.

6. The process of claim 3 wherein the polyhalogenated cyclopentadiene is hexachlorocyclopentadiene and the high molecular weight or polymeric material is linseed oil.

7. The process of claim 6 wherein the polycarboxylic compound is maleic anhydride.

8. The process of claim 7 wherein the polyhydric alcohol is glycerol.

9. The process of claim 4 wherein the polyhalogenated cyclopentadiene is hexachlorocyclopentadiene, the high molecular weight or polymeric material is linseed oil, the polycarboxylic compound is maleic anhydride, and the polyhydric alcohol is glycerol.

10. A process which comprises (A) admixing an adduct of a polyhalogenated cyclopentadiene of the formula:

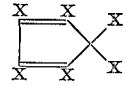

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyesters of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted, and an adduct of a polyhalogenated cyclopentadiene of said formula and a polycarboxylic compound containing carbon-to-carbon unsaturation; (B) reacting the resulting product with a polyhydric alcohol; and (C) admixing a fire retardant amount of the resulting product with a polymer.

11. The process of claim 10 wherein a compound selected from the group consisting of an antimony compound, an arsenic compound and a bismuth compound is admixed with said resulting product and said polymer.

12. The process of claim 11 wherein said antimony compound is antimony oxide.

13. A process which comprises (A) admixing an adduct of a polyhalogenated cyclopentadiene of the formula:

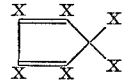

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyesters of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted, and an adduct of a polyhalogenated cyclopentadiene of said formula and a polycarboxylic compound containing carbon-to-carbon unsaturation; (B) reacting the resulting product with a polyhydric alcohol; and (C) admixing a fire retardant amount of the resulting product with a bituminous material.

14. The process of claim 13 wherein a compound selected from the group consisting of an antimony compound, an arsenic compound and a bismuth compound is admixed with said resulting product and said polymer.

15. The process of claim 14 wherein said antimony compound is antimony oxide.

16. A highly homogeneous product of components comprising (1) an adduct of a polyhalogenated cyclopentadiene of the formula:

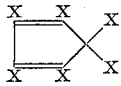

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyester of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted; (2) an adduct of a polyhalogenated cyclopentadiene of said formula and a polycarboxylic compound having aliphatic carbon-to-carbon unsaturation; and (3) a polyhydric alcohol.

17. The product of claim 16 wherein the polyhalogenated cyclopentadiene is hexachlorocyclopentadiene, the high molecular weight or polymeric material is linseed oil, the polycarboxylic compound is maleic anhydride, and the polyhydric alcohol is glycerol.

18. A composition which comprises (A) a fire retardant amount of a highly homogeneous product of components comprising (1) an adduct of a polyhalogenated cyclopentadiene of the formula:

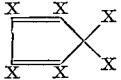

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyesters of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted; (2) an adduct of a polyhalogenated cyclopentadiene of said formula and a polycarboxylic compound having aliphatic carbon-to-carbon unsaturation; and (3) a polyhydric alcohol; in admixture with (B) a polymer.

19. The composition of claim 18 wherein the polyhalogenated cyclopentadiene is hexachlorocyclopentadiene, the high molecular weight or polymeric material is linseed oil, the polycarboxylic compound is maleic anhydride, and the polyhydric alcohol is glycerol.

20. The composition of claim 18 wherein a compound selected from the group consisting of an antimony compound, an arsenic compound and a bismuth compound is incorporated therein.

21. The composition of claim 20 wherein said antimony compound is antimony oxide.

22. A composition which comprises (A) a fire retardant amount of a highly homogeneous product of components comprising (1) an adduct of a polyhalogenated cyclopentadiene of the formula:

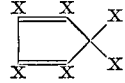

wherein each individual X is selected from the group consisting of fluorine, chlorine, bromine and an alkoxy radical of 1 to 10 carbon atoms and a high molecular weight or polymeric material containing aliphatic carbon-to-carbon unsaturation selected from the group consisting of (1) polyesters of a polyhydric alcohol and a polycarboxylic compound selected from the group consisting of polycarboxylic acids, polycarboxylic anhydrides and polycarboxylic acid halides and (2) glyceride drying oils, wherein substantially all double bonds of said material are adducted; (2) an adduct of a polyhalogenated cyclopentadiene of said formula and a polycarboxylic compound having aliphatic carbon-to-carbon unsaturation; and (3) a polyhydric alcohol; in admixture with (B) a bituminous material.

23. The composition of claim 22 wherein the polyhalogenated cyclopentadiene is hexachlorocyclopentadiene, the high molecular weight or polymeric material is linseed oil, the polycarboxylic compound is maleic anhydride, and the polyhydric alcohol is glycerol.

24. The composition of claim 22 wherein a compound selected from the group consisting of an antimony compound, an arsenic compound and a bismuth compound is incorporated therein.

25. The composition of claim 24 wherein said antimony compound is antimony oxide.

References Cited

UNITED STATES PATENTS

| | | | |
|---|---|---|---|
| 2,779,700 | 1/1957 | Robitschek et al. | 260—40 |
| 2,863,848 | 12/1958 | Robitschek et al. | 260—23.7 |
| 2,909,501 | 10/1959 | Robitschek et al. | 260—40 |
| 3,098,058 | 7/1963 | Schweiker et al. | 260—33.6 |
| 3,347,807 | 10/1967 | Blair et al. | 260—28.5 |
| 3,350,334 | 10/1967 | Skiff | 260—22 |

DONALD E. CZAJA, Primary Examiner

R. W. GRIFFIN, Assistant Examiner

U.S. Cl. X.R.

260—18, 16, 20, 21, 23, 23.3, 23.7, 26, 28.5, 45.75, 835, 842, 850, 862, 863, 873; 106—15; 117—126, 136, 161, 167, 13; 252—8.1